Figure 1:
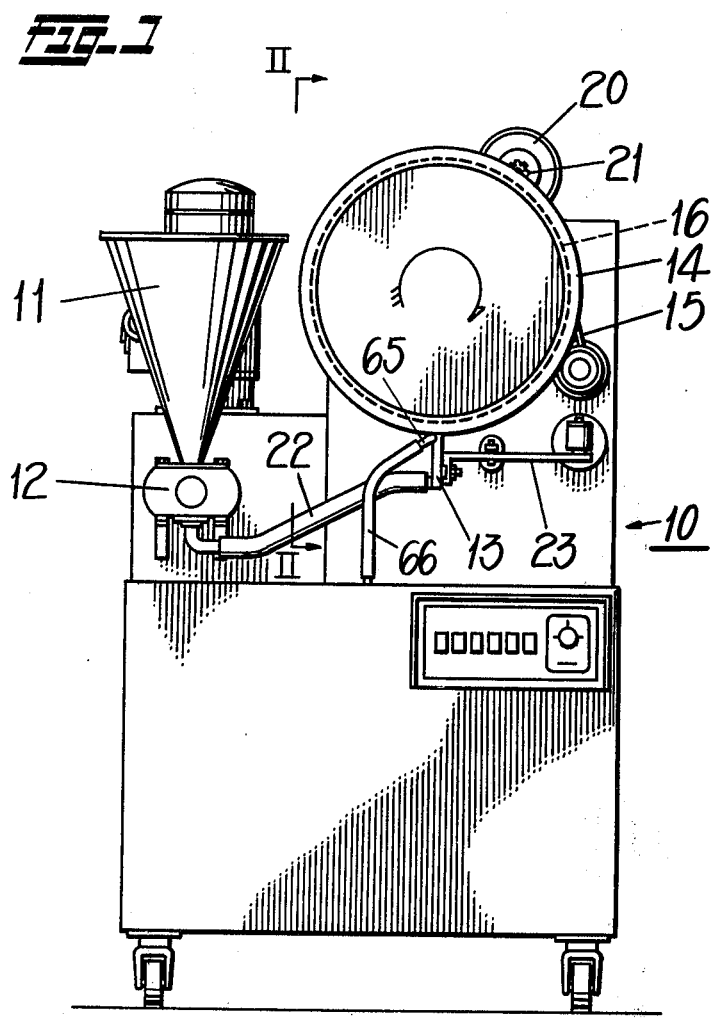

United States Patent [19]
Ohkawa

[11] 3,881,404
[45] May 6, 1975

[54] DOUGH PROCESSING DEVICE
[75] Inventor: Nobuyoshi Ohkawa, Amagasaki, Japan
[73] Assignee: Daieigiken, Inc., Amagasaki, Japan
[22] Filed: Mar. 12, 1974
[21] Appl. No.: 450,492

[52] U.S. Cl. ................. 99/353; 99/450.7; 99/536; 425/101; 425/97
[51] Int. Cl. ......................... A21c 3/04; A21b 1/42
[58] Field of Search ....... 99/353, 427, 450.1, 450.6, 99/517, 536; 425/97, 101, 107, 224

[56] References Cited
UNITED STATES PATENTS
3,565,014  2/1971  Mendoza ..................... 425/223 X

*Primary Examiner*—Harvey C. Hornsby
*Assistant Examiner*—Alan Cantor
*Attorney, Agent, or Firm*—Tab T. Thein

[57] ABSTRACT

Dough processing device, specifically one that prevents dough from sticking fast to a nozzle due to the heat of the latter. A pipe is provided along a rim of the outlet orifice of the nozzle. Cooling water is circulated in the tube, and water droplets are generated in the rim of the outlet orifice of the nozzle.

1 Claim, 3 Drawing Figures

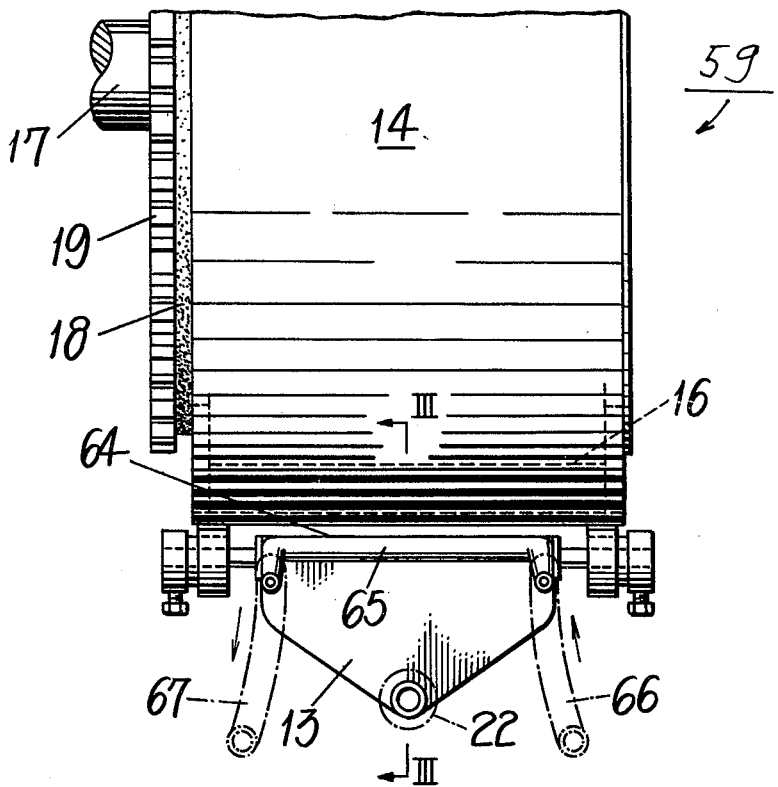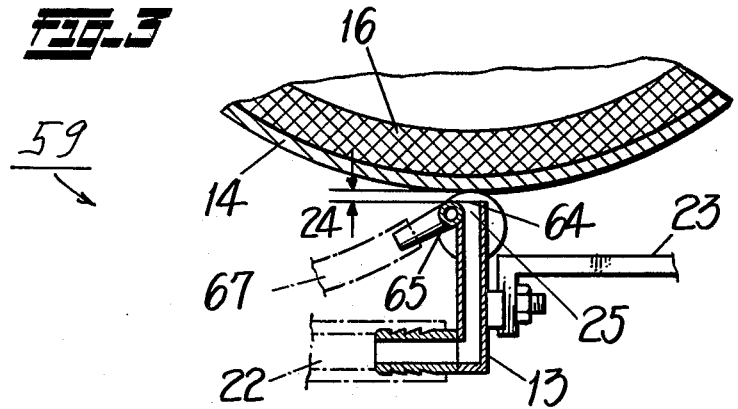

DOUGH PROCESSING DEVICE

This invention provides a dough processing device, for preventing dough from sticking fast to a nozzle from where a given amount of the dough can be pushed out continuously without sticking to the nozzle, equipped on a device for continuously producing dough sheets having a desired thickness and baking them.

In a device for pushing out dough from a nozzle provided near the outer circular surface of a rotating drum to said surface, normal continuous dough injection cannot be expected because the dough injected from the nozzle is apt to stick fast to the nozzle when heated by the drum. This prevents production of dough sheets in uniform quality and at high speeds.

Therefore, the object of this invention is to provide a device which can push out continuously a certain amount of dough without sticking fast to the rim of the outlet orifice of the nozzle.

According to the most important features of the invention, a tube is provided along a rim of the outlet orifice from where the dough is being discharged, in which tube water is made to circulate, thereby providing efficient cooling, which prevents the dough from sticking to the discharging nozzle.

It should be added at this point that this invention is closely related to those of other applications, filed simultaneously herewith, namely one on a "Device for Wrapping Sheets around Food in Rolled Form" (incorporating devices for supplying a mixture to dough sheets, another for doubling the sheets, and one for bending them); another on a "Device for Wrapping Sheets around Food;" another on a "Device for Conveying Rolled Food;" and finally one on a "Device for Processing Dough" (for forming and baking dough sheets). These applications of the inventor were all filed on Mar. 12, 1974, respectively under Ser. Nos. 450,489, 450,493, 450,490, and 450,491.

Other objects and many of the attendant advantages of the invention will be readily appreciated as the same becomes better understood by reference to the following detailed description, when considered with the accompanying drawings, wherein FIG. 1 is a front view of a device for producing dough sheets and baking them, in relation to the inventive dough processing device, for preventing dough from sticking;

FIG. 2 is an enlarged partial left-hand side view along line II—II of FIG. 1; and FIG. 3 is a cross-sectional view along line III—III of FIG. 2.

Referring to FIG. 1, a device 10 for producing dough sheets and baking them has a hopper 11, a gear pump 12, a flat, slit nozzle 13, a rotating drum 14 and a releasing plate 15. The pump 12 and the nozzle 13 are connected by a flexible tube 22. A heater 16 is equipped in the inner circular curface of the drum 14 (see FIG. 2) and a large gear 19 is fixed to the back of the drum 14. An adiabatic insulating material 18 is inserted between the drum 14 and the gear 19.

The center of the back of the drum 14 is supported by a shaft 17 so that it can rotate freely. A motor 20 is provided above the device 10. A small gear or pinion 21, fixed to the shaft of the motor 20, is engaged with said large gear 19. The drum 14 is rotated by a reduction gear connected to the motor 20, actually constituted by gears 19 and 21.

The flat nozzle 13 is fixed to a supporting arm 23 of the device 10, leaving a clearance 24 (see FIG. 3) with the drum 14 so that a rim 64 of an outlet orifice 25 of nozzle 13 faces the outer circular surface at the bottom of the drum 14.

As shown in FIGS. 2 and 3, a cooling-water tube 65 is located along the rim of the outlet orifice of the nozzle 13. A water-supply tube 66 and a water outlet 67 are respectively connected to both ends of this tube 65. The tubes 66, 67 are connected to a cooling device (not shown), and the cooling water flows from the supply tube 66 to the tube 65. The high-temperature water having passed the tube 65 returns through the tube 67 to the cooling device for cooling.

The dough in the hopper 11 is transferred to the rim 64 of the orifice 25 of the flat nozzle 13 from where a dough sheet is injected and sticks to the outer circular surface of the drum 14. The dough sheet adhering to the drum 14 is baked by the heater 16 and then released from the drum 14 by the plate 15 contacting the outer surface of the drum 14, whereby production is finished.

The nozzle 13 is located near the drum 14, and the latter is heated in the range from 70° to 230°C by the heater 16 in the drum 14; consequently the heat of the drum 14 is transmitted to the nozzle 13. In such a case, the dough sticks to the nozzle 13 due to shortage of water contained in it, before it is injected from the flat nozzle 13. Therefore a continuous constant amount of dough cannot be injected from the nozzle 13.

In the inventive dough processing device, for preventing dough from sticking, the cooling water circulates along the rim 64 of the outlet orifice 25 of the nozzle 13, the temperature of the latter being kept between 5° to 30°C, approximately. If the cooling water circulates along the rim of the outlet orifice of the nozzle 13, the temperature of the latter differs from atmospheric temperature. This difference in temperatures generates water droplets inside the rim 64 of the outlet orifice 25. This, together with the low temperature of the nozzle 13, prevents the dough from sticking fast to the nozzle 13.

It should be understood, of course, that the foregoing disclosure relates only to a preferred embodiment and to preferred features of the invention, and that it is intended to cover all changes and modifications of the exmaples described which do not constitute departures from the spirit and scope of the invention.

What I claim is:

1. A dough processing device, for the preparation of rolled food consisting of a mixture of minced vegetables, meat and the like, wrapped in a sheet of dough of predetermined size, the device comprising a heated, rotatable drum having a substantially smooth outer circular surface; a flat nozzle to which dough is supplied and which deposits the dough through an outlet orifice onto said circular surface during the rotation of said drum; a tube being disposed substantially parallel and contiguous with a rim of said orifice; and cooling-water supply and circulating means for said tube, thereby to cool the dough emerging from said orifice, producing water droplets, and thus preventing the dough from sticking to said nozzle, said orifice and said circular surface of the drum.

* * * * *